United States Patent [19]

Kagata et al.

[11] 4,296,848
[45] Oct. 27, 1981

[54] FREE WHEEL HUB MECHANISM

[75] Inventors: Tooru Kagata, Toyota; Hiromi Goto, Chiryu, both of Japan

[73] Assignee: Aisin Seiki Kabushiki Kaisha, Kariya, Japan

[21] Appl. No.: 928,263

[22] Filed: Jul. 26, 1978

[30] Foreign Application Priority Data

Jul. 27, 1977 [JP] Japan .......................... 52-100981[U]

[51] Int. Cl.³ ............................................ F16D 13/04
[52] U.S. Cl. ....................................... 192/35; 192/44
[58] Field of Search .................. 192/35, 36, 44, 45, 192/67 R, 93 A

[56] References Cited

U.S. PATENT DOCUMENTS

| | | | |
|---|---|---|---|
| 3,055,471 | 9/1962 | Warn et al. | 192/36 UX |
| 3,217,847 | 11/1965 | Petrak | 192/93 A X |
| 3,788,435 | 1/1974 | Prueter | 192/35 |
| 4,163,486 | 8/1979 | Kagata | 192/35 |

FOREIGN PATENT DOCUMENTS

Ad.16981 of 1911 United Kingdom ............ 192/93 A

*Primary Examiner*—Andrew V. Kundrat
*Attorney, Agent, or Firm*—Oblon, Fisher, Spivak, McClelland & Maier

[57] ABSTRACT

A free wheel hub mechanism made up of a body secured to a wheel, an inner race secured to an axle shaft and rotatable therewith, means for engaging the inner race with the body only upon rotation of the shaft and for otherwise permitting free rotation of the body. A shoe receiving member is secured to a spindle sleeve of the axle shaft and has a receiving surface which crosses the axle shaft at substantially a right angle. A shoe means maintains the engaging means in its engaged condition, the shoe means having a sliding surface which crosses the axle shaft at a substantially right angle, and a spring biases the sliding surface of the shoe means against the receiving surface of the shoe receiving member.

4 Claims, 6 Drawing Figures

FREE WHEEL HUB MECHANISM

BACKGROUND OF THE INVENTION

1. Field of the Invention

This invention relates to a free wheel hub mechanism, and more particularly to a free wheel hub mechanism for transmitting a driving force or torque from an axle shaft to wheels upon the application of driving force to the shaft.

2. Description of the Prior Art

Conventionally, various free wheel hub mechanisms have been proposed, for example such as disclosed in the U.S. Pat. No. 3,055,471. In such prior mechanism, however, a plurality of shoes, which are adapted to slide on a shoe receiving member secured to a non-rotatable spindle sleeve to thereby maintain the clutch means in its clutched position, are urged outwardly or radially. Since each shoe is positioned by an annular cage and is adapted to slide on an annular surface of shoe receiving member, these shoes have to be arranged adjacent to one another with proper spaces for permitting the above radial movements of the shoes. Therefore, the area of the annular surface of the shoe receiving member which corresponds to the above spaces will not act to maintain the clutch means in its clutched position. This reduces the effective frictional area between the shoes and the shoe receiving member so that the frictional force therebetween per area will increase. Thus, the shoes have less durability, or large-sized shoes are required.

SUMMARY OF THE INVENTION

Therefore, it is an object of the present invention to provide an improved free wheel hub mechanism which obviates the above drawbacks.

It is another object of the present invention to provide an improved free wheel hub mechanism which is durable and compact.

BRIEF DESCRIPTION OF THE DRAWINGS

Various other objects and many of the attendant advantages of the present invention will be readily appreciated as the same becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENT

Figure 1:
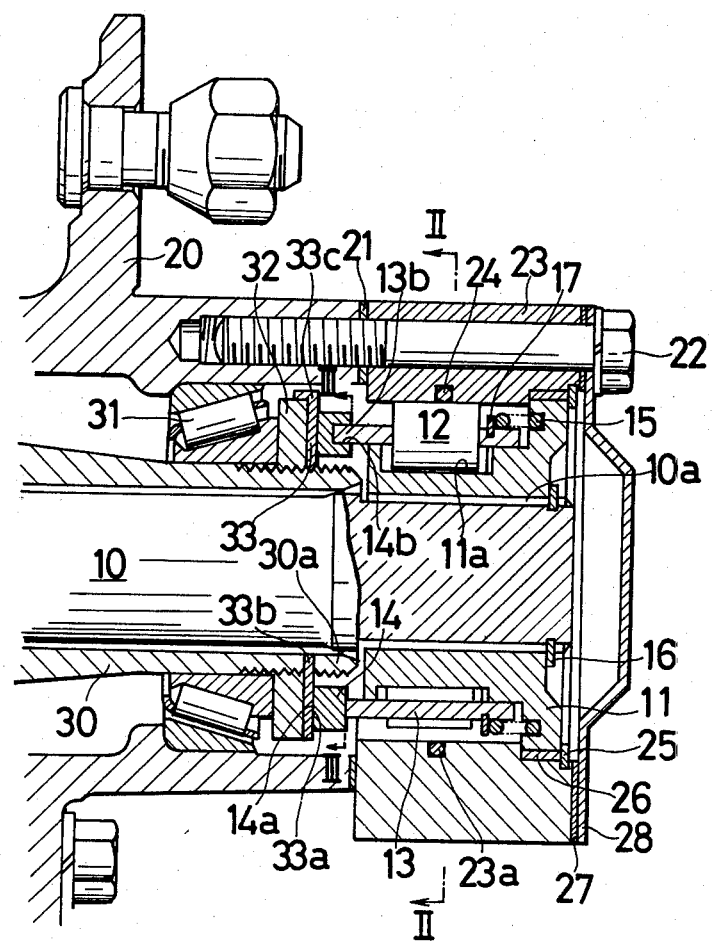
FIG. 1 is a cross sectional view of a free wheel hub mechanism illustrating a preferred embodiment of the present invention.

Referring now to drawings and particularly to FIG. 1, an axle shaft 10 passes through a non-rotatable spindle sleeve 30 and has a splined outer end 10a. Although not illustrated in FIG. 1, an inner end of the axle shaft 10 is operatively connected to a differential gear mechanism by means of a universal joint. The differential gear mechanism is adapted to receive driving power from a vehicle engine by means of a transmission by which driving conditions are changed over to two-wheel-drive of the vehicle from a four-wheel-drive of the vehicle, and vice versa.

A wheel hub 20 is rotatably mounted on the spindle sleeve 30 through means of a bearing 31 which is properly positioned by a nut 32. The wheel hub 20 is arranged so as to be assured a torque transmission from the axle shaft by means of the free wheel hub mechanism, as will be made clear hereinafter.

Figure 2:
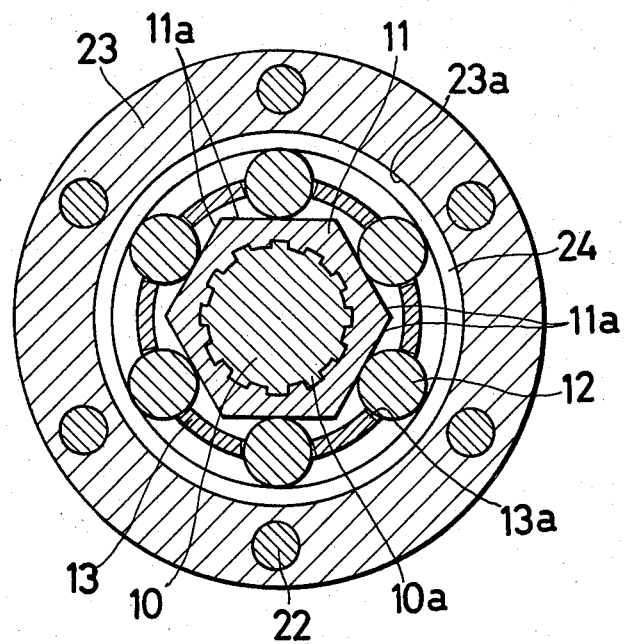
FIG. 2 is a cross sectional view taken along line II—II of FIG. 1.

The free wheel hub mechanism comprises an inner race 11 securely splined to the splined end 10a of the shaft 10, a body 23 secured to the wheel hub 20 with a gasket 21 by bolts 22, a spring band 24 positioned between the body 23 and the inner race 11, rollers or balls 12, and a cage 13 which receives the rollers 12 at equal intervals, as will be illustrated in FIGS. 1 and 2. Clips 16 and 25 prevent outer and inner peripheral ends of the inner race 11 from moving outwardly. The inner race 11 has at its outer peripheral and intermediate portion thereof six plane cam surfaces 11a which are engageable with rollers 12, respectively. The body 23 is supported and mounted on the outer periphery of the inner race 11 by means of a metal bearing 26 which is press fit within the inner wall of the body 23. The body 23 also has at inner peripheral and intermediate portions thereof an annular groove 23a which receives a spring band 24 therein. A cover 28 is secured to the body 23 through a gasket 27 by bolts 22.

Figure 3:
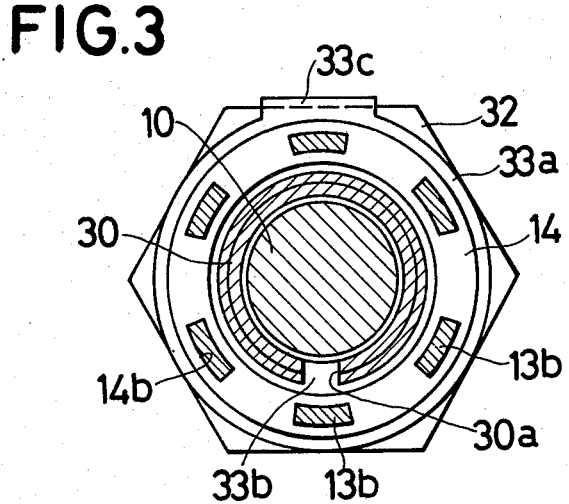
FIG. 3 is a cross sectional view taken along line III—III of FIG. 1.

Each roller 12 is urged by the spring band 24 towards the center of shaft 10 and is rotatably arranged within each opening provided on the cage 13 between the inner race 11 and the spring band 24. The rollers 12 are urged outwardly by the cam surfaces 11a when the inner race 11 is drivingly rotated by the shaft 10. Accordingly, the rollers 12 are squeezed against the inner surface of the body 23 to thereby cause the inner race 11 and the body 23 to rotate together as one body. The cage 13 is of a cylindrical configuration having at its innermost end six projections 13b which are formed along the axial line. Each projection 13b is positioned within six recesses 14b provided in a shoe 14. The shoe 14 is of a cylindrical configuration, as shown in FIGS. 1 and 3 and is axially urged or movable through a retainer 17 and the cage 13 by a coil spring 15 inserted between the retainer 17 on the cage 13 and the inner race 11. The shoe 14 includes an annular sliding surface 14a which is adapted to be slidable on an annular receiving surface 33a provided on a shoe receiving member 33. The shoe receiving member 33 is non-rotatably secured to the spindle sleeve 30 and is arranged such that the annular receiving surface 33a thereof will cross the shaft 10 at a right angle. This means that the annular receiving surface 33a slidably receives substantially the whole effective area of the sliding surface 14a of the shoe 14 which is axially urged and thus enough sliding surface area of the shoe 14 will be assured. This results in decreasing the force per area produced between both of surfaces 14a and 33a.

The shoe receiving member 33 is assembled such that a projection 33b thereof is inserted and arranged within an axial groove 30a provided on the spindle sleeve 30. A bending portion 33c of the shoe receiving member 33 which is bent after assembling prevents the nut 32 from loosening in rotating, as shown in FIGS. 1 and 3.

In assembling the above parts of the free wheel hub mechanism, the wheel hub 20 is firstly assembled via the bearing 31 on the spindle sleeve 30 and then the nut 32 is threaded through the sleeve 30 so as to properly position the bearing 31. Thereafter, the shoe receiving member 33 is arranged such that the projection 33b is aligned with, and inserted within, the axial groove 30a of the sleeve 30, and the bending portion 33c is bent against the outer periphery of the nut 32 so that the shoe receiving member 33 is assembled on the spindle sleeve 30. Then, inner race 11, rollers 12, cage 13, shoe 14, body 23, and spring 24, which are sub-assembled in advance, are assembled on the shaft 10 by means of the splined connection between the inner race 11 and the shaft 10. Finally, the body 23 is secured to the wheel hub by bolts 22.

In operation, when the transmission is positioned or set into a position to complete the two-wheel-drive of vehicle, no driving force is imparted to the axle shaft 10, so that the inner race 11 is not drivingly rotated. Between each roller 12 and spring band 24, only a relatively small friction force will be generated by the biasing force of the spring band 24 itself. Thus, the spring band 24 is relatively rotatable on rollers 12. In other words, under these conditions, the wheel hub 20 and the body 23 are rotated together on rollers 12 while inner race 11, rollers 12, cage 13, and shoe 14, which are operatively connected to the shaft 10, are stopped from rotating.

When the transmission is manipulated into another position to complete the four-wheel-drive mode of vehicle, the axle shaft 10 receives the driving force and thus the inner race 11 is drivingly rotated. Under these conditions, each cam surface 11a of the inner race 11 urges each roller 12 outwardly against the biasing force of the spring band 24, and the sliding surface of the shoe 14 is frictionally slid on the receiving surface 33a of the shoe receiving member 33, thereby causing a lag of rotation of the cage 13. Thus, each roller 12 is squeezed between each cam surface 11a and the inner surface of the body 23 so that the inner race 11 and body 23 now act as one body. The driving force which is imparted to the axle shaft 10 is now transmitted to the wheel hub 20 through means of inner race 11, rollers 12, and body 23. In other words, all of inner race 11, rollers 12, cage 13, shoe 14, spring 15, spring band 24, body 23, and wheel hub 20 are drivingly rotated together with the shaft 10. Now the shoe 14 is rotated while the sliding surface 14a is slidably and frictionally engaged with the receiving surface 33a.

When the transmission is again manipulated into the first-named position to complete the two-wheel-drive mode of the vehicle from the second named position, the body 23 rotates faster than rotation of inner race 11 and thus each roller 12 is released from its squeezed condition. The body 23 and the spring band 24 may now freely rotate each roller 12.

In the above embodiment, the shoe 14 is arranged to be urged by the coil spring 15, but it will be apparent that a dish shaped spring may be arranged in place of the above coil spring.

Figure 4:
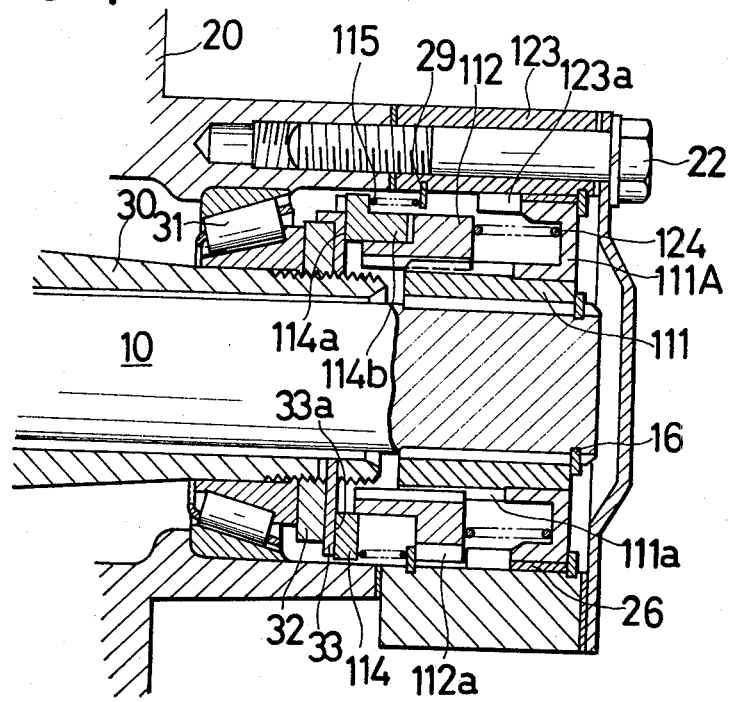
FIG. 4 is a view similar to FIG. 1 but illustrating a modification of the present invention.
Figure 5:
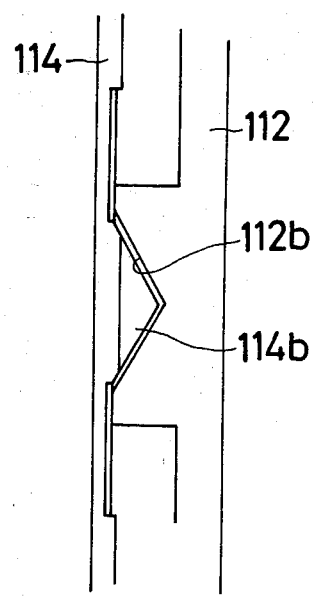
FIG. 5 is a developing view of the cam portions provided on the shoe and the movable toothed member of FIG. 4.
Figure 6:
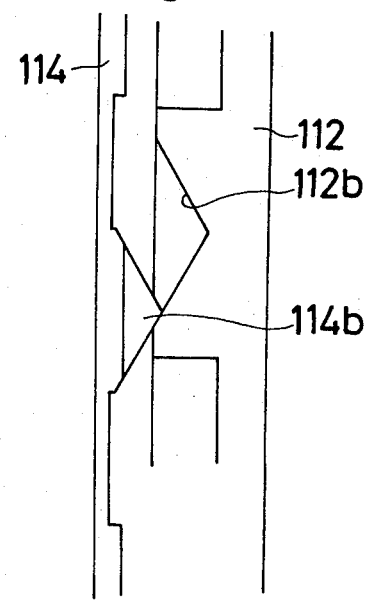
FIG. 6 is a view similar to FIG. 5, but showing the operative conditions thereof.

Turning to FIGS. 4 to 6 which illustrate a modification of the present invention, a free wheel hub mechanism includes an inner race 111 securely splined to the axle shaft 10, a body 123 secured to the wheel hub 20, a movable toothed member 112 and a shoe 114 arranged between the body 123 and the inner race 111. The inner race 111, which is prevented from moving outwardly by clip 16, has at an outer peripheral leftward portion thereof splines 111a, and thus an outer peripheral rightward portion to which an annular retainer 111A is secured. The body 123 is supported and mounted on the retainer 111A by means of the metal bearing 26 which is press fit within the inner wall of the body 123. The body 123 has at an inner peripheral intermediate portion thereof splines 123a. The movable toothed member 112 has a stepped outer periphery and is axially movably splined to splines 111a of the inner race 111. The movable toothed member 112 is urged towards the left by a coil spring 124, one end of which is seated against the retainer 111A.

The leftward movement of the toothed member 112 is limited by a clip 29 secured on the body 123. The toothed member 112 has external splines 112a which are in engagement with the splines 123a of the body 123. At the stepped portion of the toothed member 112, a projection having a V-shaped cam surface 112b is formed, as will be clear in FIGS. 5 and 6. The shoe 114 is of an annular configuration and is urged towards the left by a coil spring 115, one end of which is seated against the clip 29. Thus a sliding surface 114a of the shoe 114 is slidably received about the annular receiving surface 33a of the shoe receiving member 33 which crosses the axle shaft 10 at a right angle. A cam surface 114b is provided on the shoe and is in engagment with the cam surface 112b to thereby urge the toothed member 112 toward the right.

Other parts of this modification will be the same as those of the previous embodiment so that the same parts will be illustrated by the same numerals and the detailed description thereof will be omitted. Furthermore, the parts of this modification will be assembled in substantially the same manner as those of the previous embodiment.

The operation of this modification is as follows:

When the transmission is set into a position to complete the two-wheeldrive mode of vehicle, no driving force is imparted to the axle shaft 10 and thus the inner race 111 is not drivingly rotated. Therefore, the toothed member 112 is not rotated and is urged and maintained by the spring 124 into a position as shown in FIG. 4. This assures that splines 123a of the body 123 disengage from splines 112a of the toothed member 112. Thus, the body 123 and the wheel hub 20 are freely rotating by means of bearings 31 and 26.

When the transmission is manipulated into a position to complete the four-wheel-drive mode of the vehicle, the axle shaft 10 receives the driving force, and thus the inner race 111, and the toothed member 112, are drivingly rotated. The toothed member 112 is now urged towards the right against the biasing force of the spring 124 by means of the cam operation of cam surfaces 114b and 112b since the shoe 114 is urged in contact with the shoe receiving member 33. Thus, the toothed member 112 is splined to splines 123a of the body 123. The body 123 and the wheel hub 20 are now drivingly rotated with inner race 111, toothed member 112, and shaft 10 as one body. Under these conditions, a force of engagement is generated between splines 112a and 123a of toothed member 112 and body 123, and the shoe 114 is urged into press contact with, and to be frictionally slid onto, the shoe receiving member 33, so that the shoe 14 is caused to be rotated behind the rotation of toothed member 112. Thus, the toothed member 112 is maintained in the position where the splines 112a thereof will engage with splines 123a of the body 123. Now, the shoe 114 is rotated while the sliding surface 114a is frictionally slid on the receiving surface 33a of shoe receiving member 33. It is noted that the effective area of the sliding surface 114a of this modification will be large, as in the previous embodiment.

When the transmission is changed over into the two-wheel drive mode of vehicle from the four-wheel-drive mode of vehicle, the spring 124 biases the toothed member 112 into the position shown in FIG. 4 so that the splines 112a disengage from splines 123a of the body 123. Thus the body 123 is now freely rotating again.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A free wheel hub mechanism comprising:
   a body secured to a wheel;
   an inner race secured to an axle shaft and rotatable therewith;
   means for engaging said inner race with said body only upon rotation of said shaft and for permitting the free rotation of said body upon non-rotation of said shaft;
   a shoe receiving member secured to a spindle sleeve of said axle shaft and having a receiving surface located entirely in a plane which crosses said axle shaft at a substantially right angle;
   a shoe means for maintaining said engaging means in its engaged condition and having a sliding surface located entirely in a plane which crosses said axle shaft at a substantially right angle; and
   a spring biasing said sliding surface of said shoe means against said receiving surface of said shoe receiving member whereby the sliding contact between said sliding surface and said receiving surface maintains the engagement of said engaging means,
   wherein said engaging means comprises a cage arranged between said inner race and said body, and rollers positioned within said cage, said rollers being urged outwardly by a cam surface provided on said inner race upon rotation of said shaft and being thus squeezed against said body.

2. A free wheel hub mechanism as set forth in claim 1, wherein, said shoe means is a single shoe member.

3. A free wheel hub mechanism as set forth in claim 1, wherein,
   said shoe means has recesses which receive projecting ends of said cage.

4. The free wheel hub mechanism of claim 1 wherein said body, said inner race, said shoe, said spring and said cage constitute a pre-assembled assembly which may be positioned on said axle shaft as a unit.

* * * * *